J. BOHAN.
MOTOR VEHICLE.
APPLICATION FILED MAR. 28, 1916.
1,194,127.
Patented Aug. 8, 1916.
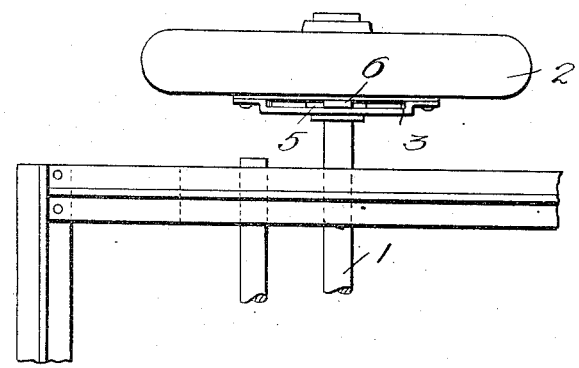
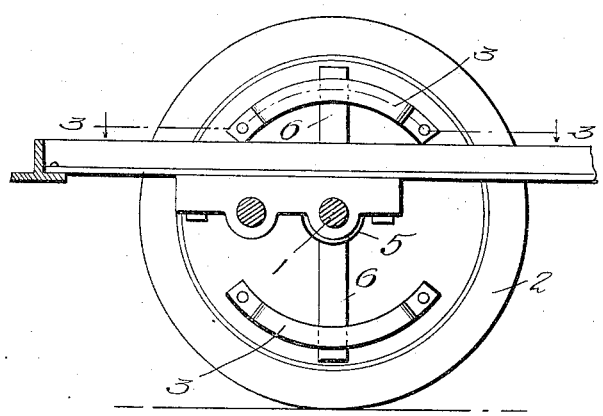
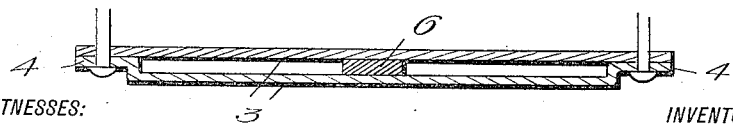
WITNESSES:
F. C. Barry
C. E. Trainor
INVENTOR
Jeremiah Bohan
BY
ATTORNEYS

UNITED STATES PATENT OFFICE.

JEREMIAH BOHAN, OF NEW HARTFORD, IOWA.

MOTOR-VEHICLE.

1,194,127.  Specification of Letters Patent.  Patented Aug. 8, 1916.

Original application filed June 24, 1915, Serial No. 36,114. Divided and this application filed March 28, 1916. Serial No. 87,206.

*To all whom it may concern:*

Be it known that I, JEREMIAH BOHAN, a citizen of the United States, and a resident of New Hartford, in the county of Butler and State of Iowa, have invented a new and useful Improvement in Motor-Vehicles, of which the following is a specification.

My invention is an improvement in motor vehicles, and has for its object to provide a connection between the wheels and the axle that will permit the wheels to move angularly with respect to the axle within limits, yet will constrain the wheels to move with the axle, thus dispensing with the necessity for differentials.

In the drawings:—Figure 1 is a top plan view of a wheel provided with the improvement, Fig. 2 is a side view from the inner side, and Fig. 3 is an enlarged section on the line 3—3 of Fig. 2.

The present embodiment of the invention is shown in connection with the axle 1 of a motor vehicle, and the wheel 2 of ordinary construction, journaled on the axle in the usual manner. The wheels 2 are connected with the axles both front and rear in such manner that while the wheels may move angularly with respect to the axles within limits, yet they must move with the axles when these limits have been exceeded. The necessity for differential gears is thus dispensed with.

Each wheel has secured to the inner face thereof a pair of guide members 3, and the said members are on opposite sides of the center of the wheel. Each of the guide members comprises two parallel plates or bars spaced apart from each other, and connected at their ends. One of the members of each pair has lugs 4 at its ends which are offset laterally from the body of the bar and superposed on the other bar to space the first-named bar from the last-named bar. The bars at their ends are secured to the wheels in any suitable or desired manner and the passages between the plates of the guide members of each wheel are in register. The guide members are curved as shown on an arc whose center is that of the wheel.

A cross head is rigidly secured to the axle at each wheel, each cross head comprising a hub 5 and oppositely extending arms 6. The hub of each cross head has a polygonal opening fitting a similarly shaped portion of the axle and the arms engage the guides of the wheel. The hub of the cross head may be held in place on the axle by the wheel or any preferred form of limiting means may be provided for preventing movement of the head longitudinally of the axle. It is obvious also that the cross heads might be keyed to the axle if desired, or secured thereto in any suitable or desired manner.

The passages of the guides 3 are of such length that the arms of the cross head may move within limits therein, but it will be evident that when the said arms engage the ends of the passages then the wheel must move with the cross head. When either axle moves forwardly it does not affect the wheels until the arms of the cross heads engage the ends of the passages in the guides.

In turning corners one wheel must move faster than the other or it must slip, and the lost motion connection between the axle and the wheel permits this different relative movement of the wheels of each axle with respect to each other.

The present application is a division of my prior application, Serial No. 36,114, filed June 24, 1915.

I claim:—

1. The combination with an axle and wheels mounted loosely upon the axle, of members projecting radially from the axle, and pairs of arcuate plates attached to the wheels and receiving the outer ends of the said members between them, and permitting said wheels having a limited angular movement in each direction.

2. The combination with an axle and wheels mounted loosely thereon, a cross head on the axle at each wheel, and arcuate guides on the wheels for receiving the ends of the cross heads, and of a length to permit the wheels to have a limited angular movement in each direction.

JEREMIAH BOHAN.

Witnesses:
F. B. MILLER,
F. S. GILKEY.

Copies of this patent may be obtained for five cents each, by addressing the "Commissioner of Patents, Washington, D. C."